United States Patent Office 2,765,229
Patented Oct. 2, 1956

2,765,229

METHODS OF PRODUCING WET-LAID CELLULOSE FIBROUS PRODUCTS CONTAINING SYNTHETIC RESINS

Paul J. McLaughlin, Moorestown, N. J., assignor to Rohm & Haas Company, Philadelphia, Pa., a corporation of Delaware No Drawing. Application February 15, 1954,
Serial No. 410,450

6 Claims. (Cl. 92—21)

This invention relates to improved fibrous products containing synthetic linear resins which are characterized by increased dry strengths, particularly increased dry burst, tear, and tensile strengths. It is particularly concerned with the production of resin-containing fibrous products, such as papers, felts, or other molded fibrous products having increased dry strengths and methods of producing them.

In the past, various materials have been applied to fibrous products, especially to aqueous dispersions of paper-making or felt-making fibers prior to the wet laying of such dispersions for the purpose of improving the dry strengths thereof. For example, latices of polychloroprene have been introduced into fiber dispersions, such as in the beater, and the paper or other fibrous products obtained have been characterized by improved dry strengths. However, the application of this type of material also increases the wet strength so that it prevents "broke" recovery. This characteristic may be an advantage where wet strength is desired. However, in many cases, such as in the case of papers or felts intended for use in such applications as backing for flooring or roofing materials where the sheeted product is subsequently coated or impregnated, high wet strength is unnecessary and the prevention of "broke" recovery because of such wet strength is undesirable.

It has been found that synthetic linear polymers derived from monomers containing a single vinylidene group ($CH_2=C=$) such as polyvinyl compounds and polyacrylic compounds can be highly effective for the improvement of dry strengths of such fibrous products when they are properly distributed within the fibers forming the sheet. However, the fibers exert substantially no tendency to adsorb many of such synthetic linear polymers when they are mixed in an aqueous dispersion so that substantially all of the polymer is lost during the sheeting operation. It has already been suggested to apply a cationic flocculating agent to the fiber dispersion before introducing the polymer dispersed by means of anionic emulsifying or anionic emulsion stabilizing agents. The action of the flocculating agent in the suggested procedure is merely to neutralize the anionic agent in the polymer dispersion so as to destroy its stability and cause precipitation or deposition of the polymer.

The use of emulsifiers or emulsion stabilizing agents of anionic character has the disadvantage that whenever polyvalent metal ions come into contact with the dispersions, whether by accident or otherwise, the dispersions become unstable and the resin is deposited as flocs or adhesive masses in the pipe lines and tanks which serve for storing and conveying such dispersions.

It is an object of the present invention to provide modified synthetic linear resins which are flocculated not by any reaction between a cationic flocculating agent and an anionic dispersing agent, but instead by the direct action of anionic groups in the polymer upon a cationic material. In this system, the cationic member not only flocculates the resin but serves to anchor it to the fiber by the formation of a direct bond between the cationic anchoring member and the anionic resin, and by the affinity of the cationic material with the fiber, especially when the fiber is of cellulosic character. Another object of the invention is to provide a process for improving the dry strengths of fibrous products, especially of cellulosic fibers, by the use of aqueous dispersions of synthetic linear polymers which are free of anionic emulsifying, dispersing, or emulsion stabilizing agents whereby precipitation of flocs, adhesive masses and the like in tanks, pipe lines and so forth, which serve the resin dispersion to the fibrous product or aqueous dispersion thereof is prevented. Other objects and advantages will be apparent from the description hereinafter.

In accordance with the present invention, the fibrous material is treated with a poly-cationic nitrogen compound and a synthetic linear polymer comprising carboxyl groups or salts thereof such as those of ammonium hydroxide or the alkali metals, such as sodium and potassium or the like, is applied in the form of an aqueous dispersion. The dispersion may be a simple water solution formed without the aid of dispersing agents when sufficient carboxyl groups are present in the polymer molecule, or it may be a dispersion of the polymer formed by means of a non-ionic dispersing agent when the polymer contains a relatively low percentage of carboxyl groups and, therefore, is insufficiently hydrophilic to be dispersible in water without a dispersing agent. The poly-cationic compound and the resin dispersion may be applied to the fibers in either order, but it is generally preferable to apply the cationic compound first.

One or more of the cationic nitrogen atoms of the poly-cationic nitrogen compound, being positive in character, is believed to be adsorbed by the cellulosic fiber of negative character, and another or others of the cationic nitrogen atoms is believed to combine with a carboxyl group of the linear polymer so as not only to precipitate the polymer, but also by virtue of the affinity between the fiber and poly-cationic and between polycationic and resin, to anchor the resin to the fiber. When the poly-cationic contains more than two cationic nitrogen atoms, several such atoms may be attracted to the groups on one or more cellulose molecules, and other cationic nitrogen atoms may be attracted to the carboxyl groups of one or more resin molecules. It has been found that the retention of the resin effected by this bonding or anchoring action is substantially stoichiometric. This results in thorough distribution of the resin among the fibers and prevents irregular "grape bunch" deposition.

The poly-cationic compounds of the invention are poly-quaternary ammonium compounds having a molecular weight or average molecular weight of 500 to 10,000 or higher, preferably 600 to 3,000. For example, they may be water-soluble subresinous to resinous condensation products of polyalkylenepolyamines with poly-functional aliphatic dihalides or halohydrins which may or may not be further reacted with urea or with primary urea-formaldehyde condensation products, such as dimethylolurea, the final product being in any event water-soluble. Examples of polyfunctional aliphatic compounds are ethylenedichloride, alphadichlorohydrin, dibromohydrin, di-iodohydrin, epichlorohydrin, epibromohydrin, epi-idohydrin, diepi-iodohydrin. The alkylenepolyamines used in preparing the cationic reaction products employed in practicing our invention are well-known compounds corresponding to the formula $H_2N(C_nH_{2n}.HN)_xH$ in which x is one or more. Typical amines of this class are the alkylenediamines such as ethylenediamine and 1,3-propylenediamine and polyalkylenepolyamines such as diethylenetriamine, triethylenetetramine, tetraethylenepentamine and the corresponding polypropylene polyamines and polybutylene-polyamines. The halohydrins are derivatives of glycerol in which one terminal hydroxy group is substituted by a halogen atom; i. e. by chlorine, bromine and the like. It has been found that the products which they form by reaction with alkylenepolyamines contain quaternary ammonium groups, and this is probably the reason why these products are substantive to cellulose fibers.

The cationic products of this type may be those disclosed in Yost and Auten, 2,616,874. As disclosed therein, they may be prepared by reacting one mole of a polyamine, and preferably an alkylenepolyamine such as ethylenediamine or a polyalkylenepolyamine such as diethylenetriamine or tetraethylenepentamine with 1 to 3 moles, preferably 1 to 1.6 moles, of a polyfunctional halohydrin or aliphatic dihalide, such as ethylene dichloride depending upon the particular polyamine. When the higher proportions of the polyfunctional halohydrin or aliphatic dihalide are used, from 1.3 to 2 moles per mole of polyamine, the reaction should be carried out in two, three or more steps or stages with only a part of the halohydrin or dihalide present in each stage. Between stages, the hydrogen halide is preferably neutralized by a base, e. g. sodium hydroxide or sodium carbonate. This reaction is preferably carried out in an aqueous, alcoholic, or aqueous alcoholic solution at temperatures below the boiling point of the mixture, usually about 50° to 70° C. when a halohydrin is employed, or at temperatures of about 60° to 150° C. when an aliphatic dihalide is used, in order to permit the use relatively concentrated solutions while obtaining the product in a hydrophilic or water-dilutable condition. Usually the halohydrin or dihalide is added slowly to the polyamine, which is preferably dissolved in water or a water-miscible solvent such as alcohol, at a rate such that the reaction temperature is maintained at the desired temperature.

When a thermosetting cationic product of this type is desired, the reaction product of the polyamine with the halohydrin, the alkylene dichloride or the like, after the initial exothermic reaction, may be maintained at 60°–70° C. until an increase in viscosity is noted, indicating that the second stage of the resin-forming reaction has set in, after which it is cooled and diluted with water if necessary to form a stable syrup. In some cases, and particularly where a dihalohydrin is being used, sufficient alkali such as sodium hydroxide, sodium or potassium carbonate, or sodium or potassium phosphate may be added before or during the second stage of the reaction to neutralize the syrup by combining with any hydrohalide that is not taken up by the polyamine. This alkali addition also frequently gives improved results when condensing a polyamine of relatively low molecular weight, such as ethylenediamine, diethylenetriamine, or triethylenetetramine with several molecular proportions of a monohalohydrin such as epichlorohydrin in the preparation of a thermosetting resin. If desired, the syrup may be subjected to a vacuum distillation after the first stage of the reaction is completed to remove any unreacted epichlorohydrin, dichlorohydrin or other polyfunctional halohydrin.

Another thermosetting type may be prepared by reacting the condensation product of the polyamine and halohydrin or aliphatic dihalide with urea. For example, triethylenetetramine (1 mole) is condensed with ethylene dichloride (1 mole) and the resulting product is further condensed with 0.6 mole of additional ethylene dichloride. The resulting product, after removal of water, is condensed with 0.2 to 1.5 mole of urea per —NH— group available for reaction by fusion at 100–200° C., the preferred range being 120–150° C. until solution viscosity of B–M is obtained (Gardner-Holdt on 50% aqueous solution). The resulting condensate may be used as such or, if desired, it may be reacted further with formaldehyde, for example, using 0.6 to 1.5 mole of formaldehyde per hydrogen on nitrogen atom as determined by calculation from the amounts of polyethylenepolyamine and urea used. In this calculation it is assumed that each unreacted —NH— group provides one hydrogen and that each reacted mole of urea provides 2 hydrogens.

Another cationic material that may be used is polyethyleneimine which always contains quaternary ammonium groups.

The poly-cationic compounds that may be used include the polymers or copolymers of styrene, vinyltoluene, or the cumarone-indene class which have been chloroalkylated, such as chloroethylated or chloromethylated, to introduce one chloroalkyl group, such as a chloroethyl or chloromethyl group for each 1 to 5 monomeric units in the polymer, and subsequently quaternized by heating with a tertiary amine such as trimethylamine, triethanolamine, dihexylmethylamine, benzyldimethylamine, pyridine, triethylamine, phenydimethylamine, and so on. The compounds of this group are particularly valuable because they can be derived from resinous materials of initial low cost, of which the resins of the cumarone-indene class are especially important, and they can be represented generally by the following structural formula:

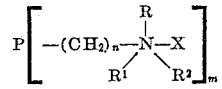

where P is the residue of the polymer or copolymer of the styrene, vinyl toluene and cumarone-indene class, $n$ is an integer having values of 1 to 4 or more but preferably no more than 2, $m$ has such a value in the preferred group that the compound contains at least one quaternary ammonium group per 1 to 5 monomeric units in the residue, P, X is OH, or a negative, salt-forming radical, R, $R^1$ and $R^2$ are each selected individually from the class consisting of aliphatic, alicyclic, aryl, arylaliphatic, and heterocyclic groups, except that at least two of R, $R^1$ and $R^2$ may together constitute with the N atom a heterocyclic group. The quaternized polymers of the cumarone-indene class are disclosed and claimed in the application of Earl W. Lane, Ser. No. 410,431, filed on even date herewith and in the hands of a common assignee.

Other specific poly-cationics are mentioned in the examples.

The synthetic linear polymer that is to be anchored to the fibers of the products include the polymers of acrylic acid, methacrylic acid and itaconic acid, having average molecular weights of 1,000 to 300,000 or higher. Homopolymers of these acids may be applied from aqueous solutions or colloidal dispersions without the use of a dispersing agent, and copolymers containing a large proportion of one or more of these acids as the substituent monomer units may be similarly employed. However, it is preferred to employ copolymers containing a minor proportion of one or more of these acids so that the polymer is insoluble in water. In such cases, dispersions containing a large proportion of solids as high as 40–60% can be easily applied because they are of low viscosity, being substantially of watery-consistency. For example, copolymers of a mixture of monomers containing 0.5 to 8% by weight of a carboxyl-containing monomer are preferably employed. Such dispersions may be prepared simply and effectively by copolymerizing one or more of the acids above with another copolymerizable compound containing a single vinylidene group in an emulsion system with a non-ionic emulsifier which subsequently serves to maintain the polymer formed in dispersed condition.

Other polymerizable compounds containing a single vinylidene group that may be copolymerized with one or more of the acids above or with salts of such acids include the following esters of acrylic acid or methacrylic acid and monohydric alcohols such as methyl, ethyl, butyl, octyl, dodecyl, cyclohexyl, cyanoethyl, aminoethyl, and the like; esters of itaconic acid and the above alcohols; esters from maleic, fumaric or citraconic acids, and the above alcohols; vinyl esters of carboxylic acids such as acetic, propionic, butyric, and the like; vinyloxyalkyl esters such as vinyloxyethyl acetate, etc.; vinyl ethers such as ethyl vinyl ether, butyl vinyl ether, octyl vinyl ether, hydroxyethyl vinyl ether, aminoethyl vinyl ether, aminopropyl vinyl ether, dimethylaminoethyl vinyl ether, vinyloxyethoxyethanol, vinyloxypropoxyethanol; methacrylonitrile or acrylonitrile; acrylamide, or methacrylamie, and N-substituted amides of these types; vinyl chloride, vinyl bromide, vinylidene chloride, vinylidene fluoride, vinylidene cyanide, 1-chloro-1-fluoroethylene, ethylene, styrene, 2-vinylpyridine, 4-vinylpyridine, 2-methyl-5-vinylpyridine.

The non-ionic emulsifiers or dispersing agents that may be used for preparing the monomeric emulsions before copolymerization or dispersions of the polymer after polymerization include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; block copolymers of ethylene oxide and propylene oxide comprising a hydrophobic propylene oxide section combined with one or more hydrophilic ethylene oxide sections.

As pointed out above, the use of a non-ionic dispersing agent where dispersions of water-insoluble resins are employed is quite important since such agent assures stability of the resin dispersions and prevents flocculation that would otherwise occur, particularly when anionics are present, when stray polyvalent metal ions, such as of iron, lead, aluminum or the like are encountered. Such polyvalent metal ions may be introduced as impurities by accident or otherwise, particularly when such other materials as alum are also being used for treating the paper. With the use of non-ionic dispersing agents, such stray polyvalent metal ions may be encountered in the paper, felt or fiber product-forming operations, such as on the wire, on felts, conduits, or sewer lines, without causing formation of sludges, flocs, or adhesive masses that would tend to accumulate on and possibly clog such equipment.

Particularly valuable resin dispersions are obtained by emulsifying a mixture of (a) one or more monomeric esters of acrylic and/or methacrylic acid and (b) monomeric acrylic, methacrylic and itaconic acid or mixtures of these acids in water and polymerizing the mixture while it is in the emulsified form. The monomeric esters of acrylic and methacrylic acids, which have proven to be most satisfactory, are the alkyl esters in which the alkyl group contains one to eight carbon atoms and which are exemplified by the following: methyl, ethyl, n-propyl, isopropyl, n-butyl, isobutyl, sec.-butyl, tert.-butyl, isoamyl, tert.-amyl, hexyl, heptyl, n-octyl, and 2-ethylhexyl acrylates and methacrylates and isomers of these. From 0.25% to 25% on a weight basis, preferably from 0.5% to 8%, of the acid is employed.

The polymerizable emulsions can be prepared at temperatures from 0° C. to about 100° C., but intermediate temperatures are much preferred. Thus, with the esters in which the alkyl group contains one to four carbon atoms a temperature from about 10° C. to about 60° C. is employed whereas a higher temperature, e. g., 30° C. to 80° C., is recommended when esters containing five to eight carbon atoms in the alkyl group are copolymerized. Peroxidic free-radical catalysts, particularly catalytic systems of the redox type, are recommended. Such systems, as is well known, are combinations of oxidizing agents and reducing agents such as a combination of potassium persulfate and sodium metabisulfite. Other suitable peroxidic agents include the "per-salts" such as the alkali metal and ammonium persulfates and perborates, hydrogen peroxide, organic hydroperoxides such as tert.-butyl hydroperoxide and cumene hydroperoxide, and esters such as tert.-butyl perbenzoate. Other reducing agents include water-soluble thiosulfates and hydrosulfites and the salts, such as the sulfates, of metals which are capable of existing in more than one valence state such as cobalt, iron, nickel, and copper. The most convenient method of preparing the dispersions of copolymers comprises agitating an aqueous suspension or emulsion of a mixture of copolymerizable monomers and a redox catalytic combination at room temperature without the application of external heat. The amount of catalyst can vary but for purposes of efficiency from 0.01% to 1.0%, based on the weight of the monomers, of the peroxidic agent and the same or lower proportions of the reducing agent are recommended. In this way it is possible to prepare dispersions which contain as little as 1% and as much as 60% or even more of the resinous copolymer on a weight basis. It is, however, more practical and hence preferred, to produce dispersions which contain about 30–50% resin-solids.

The two-stage treating process of the present invention may be applied to formed fiber products even after drying thereof, but preferably before such drying. Whenever the product-forming operation involves the handling of a fiber dispersion or suspension, it is preferable to apply the treatment to the fibers while in such a suspension. Thus, in paper-forming operations, it is preferred to apply the two-stage treatment to the aqueous dispersion of the fibers, such as in the beater, at the Jordan, in the fan pump, in the stuffbox or in the headbox. The two-stage treatment may be applied to fiber dispersions of any consistency, especially including those containing 0.5–6% of fiber in conventional paper-making practice. If desired, after introduction of the poly-cationic compound and the resin, the fiber dispersion may be diluted to lower concentrations such as to 0.001–0.5% in preparation for the sheeting operation which may take place on any suitable equipment, such as on the wire of a conventional Fourdrinier paper machine.

The amount of carboxyl-containing resin that may be deposited on the fibrous product may be from 0.5 to 100% by weight of the fiber. For most purposes, a proportion of 10–50% resin on this basis is preferred. For anchoring the resin to the fiber, a proportion of 0.02 to 10% by weight of the fiber, of the poly-cationic nitrogen compound may be used. The ratio between the resin and the cationic compound is from 5:1 to 100:1, a preferred ratio being about 10:1. While deposition of the resin is essentially stoichiometric, as pointed out hereinabove, the proportion of resin to cationic compound may vary widely within the range of ratios given above without encountering objectionable, irregular "grape-bunch" deposition. The pH during deposition, that is at the time of introduction of the resin into the poly-cationic-compound-treated fiber, may be within the range of 4–9.5, but in most cases, it has been found that a range of 7–8.5 is quite suitable, and because of the non-acidity of this range, it is preferred. The pH may be controlled, not only at the point of deposition as defined hereinabove, but also throughout the subsequent handling of the treated fiber mass, particularly to the point of sheet formation or molding.

In the following examples, which are illustrative of the invention, the percent of anchoring agent and of resin are based on the weight of the fiber; the percent retention where given is based on the weight of the resin; the strengths given are all based on a dry product conditioned over a period of at least twelve hours at 50% relative humidity at a temperature of about 75° F.; the burst strength is in lbs./sq. in.; the tear strength is in grams per 16 sheets determined by the Elmendorf procedure; the tensile strength is in grams per inch width; the stiffness is obtained by the Gurley method and is given in grams; and the porosity is in seconds per 100 cc. of air, determined by the Gurley method; the pH where given is at deposition as defined hereinabove. The compositions of the resins are given in weight percents, and were used in the form of dispersions containing non-ionic dispersing agents, except where otherwise noted.

*Example 1*

Successive proportions of an aqueous dispersion of a mixture of fibers derived from rags, waste paper, and wool were introduced into a beater, beaten to a Canadian Standard Freeness of 545 cc., and mixed with an anchoring agent obtained by the condensation of triethylenetetramine with 1.6 moles of ethylenedichloride effected as follows:

The ethylenedichloride was added to the polyamine in two stages. During the first stage which used about 1.0 moles ethylenedichloride, the ethylenedichloride was added to a solution of the triethylenetetramine in water initially at 100° C. and the temperature was maintained at 100–110° C. during the addition. The mixture was then heated at 120° C. until the viscosity of a sample diluted with water in an amount of one-third of the weight of sample shows a viscosity of Q–R (25° C.) on the Gardner-Holdt scale. The reaction mixture was then cooled to 100° C. and treated with 50% NaOH to neutralize generated hydrochlorides; it was then cooled to 70° C. and 0.6 moles of ethylenedichloride were added. The mixture was heated to refluxing temperature (up to 112° C. in 2 hours), then held at this temperature until the viscosity of a 10 gram sample diluted with 7.5 grams of water was about C on the Gardner-Holdt scale. The mixture was then diluted with water to a convenient concentration and treated with 50% NaOH at 70° C. to destroy all hydrohalide.

After the anchoring agent was introduced and mixed into the dispersion, a dispersion of an ammonium salt of a copolymer of 66% ethylacrylate with 32.7% of methyl methacrylate and 1.3% of methacrylic acid containing, as a dispersing agent, an octylphenoxypolyethoxyethanol having an average of about 39 oxyethylene units per molecule, was stirred into the mixture. After deposition (and drying at 200° C. for 2 minutes) to form a felt having a thickness of 6 mils adapted to serve as a backing for flooring material such as linoleum, the strengths of the felt were as indicated in Table I, which includes the comparison of a similar felt obtained without treatment with the anchor and resin.

TABLE I

| Anchor, Percent | Resin, Percent | Retention of Resin, Percent | pH | Properties of Felt | | |
|---|---|---|---|---|---|---|
| | | | | Burst | Tear | Tensile |
| 0.0 | 0.0 | ------ | ---- | 4.7 | 39 | 4.2 |
| 0.02 | 3.0 | 100 | 7.3 | 5.4 | 46 | 4.5 |
| 0.1 | 15.0 | 77 | ---- | 9.0 | 50 | 6.3 |
| 0.5 | 15.0 | 41 | 8.7 | 9.8 | 68 | 6.3 |

*Example 2*

The procedure of Example 1 was carried out using the same anchoring agent but replacing the resin with the ammonium salt of a copolymer of 87% ethyl acrylate, 8% methyl methacrylate, and 5% methacrylic acid. The properties in a 6-mil felt obtained therefrom were as indicated in Table II.

TABLE II

| Anchor, Percent | Resin, Percent | Properties of Felt | | |
|---|---|---|---|---|
| | | Burst | Tear | Tensile |
| 0.0 | 0.0 | 4.7 | 39 | 4.2 |
| 0.2 | 15 | 12.4 | 61 | 7.1 |

*Example 3*

The procedure of Example 1 was followed using the same resin as in Example 1 in different proportions as indicated in the following table and using various proportions of an anchor obtained by the condensation of diethylenetriamine with 1.88 moles of ethylenedichloride effected in three stages as follows:

In the first stage, diethylenetriamine (1 mole) was heated to about 105° C. and 0.7 mole of ethylenedichloride was added while the temperature was kept at 105°–110° C. The mixture was heated to 120° C. and held at this temperature until the viscosity of a sample diluted with water in a ratio of 2:1 was between D and E (25° C.) on the Gardner-Holdt scale. The mixture was cooled, and 50% aqueous NaOH added to destroy hydrohalide. The mixture was then heated to 105° C. and 0.6 mole ethylenedichloride added while the temperature was kept between 105° and 110° C. The mixture was heated at 112° C. until the product had a viscosity of W to W+ (Gardner-Holdt). It was then cooled to 100° C., and hydrohalides neutralized by addition of 50% aqueous NaOH. The reaction mixture was again heated to 105–110° C. and 0.58 mole ethylenedichloride added over a 2.5 hour period. Following this, the mixture was heated at 112° C. under reflux until the viscosity of the mixture (salt first removed by centrifuging) was about X (Gardner-Holdt). The product was cooled and treated with 50% aqueous NaOH to liberate generated hydrohalide.

The felted sheets were pressed at 70 lbs. per sq. in. gauge for two minutes before drying, and the dried felts had a thickness of 50 mils. Drying was effected at 30 minutes at about 180° C. The properties of the felts obtained were as indicated in Table III.

TABLE III

| Anchor, Percent | Resin, Percent | Retention, Percent | pH | Treated Felt Properties | | | | |
|---|---|---|---|---|---|---|---|---|
| | | | | Burst | Tear | Tens. Str. | Stiffness | Porosity |
| 0.0 | 0.0 | ---- | 7.1 | 57 | 340 | 26 | 16 | 3.5 |
| 0.0 | 25.0 | 0.0 | 7.0 | 61 | 336 | 27 | 14 | 3.9 |
| 1.5 | 15.0 | 71 | 8.7 | 153 | 656 | 58 | 18 | 6.9 |
| 2.5 | 25.0 | 58 | 9.0 | 186 | 752 | 68 | 18 | 8.6 |
| 2.5 | 50.0 | 41 | 8.9 | 198 | 800 | 68 | 20 | 9.9 |
| 5.0 | 50.0 | 54 | 9.2 | 261 | 869 | 91 | 19 | 16.0 |

*Examples 4–8*

The procedure of Example 1 was followed with various anchoring agents using the free carboxyl acid form of the resins of Example 1 instead of the ammonium salt. In each case, 0.5% of the anchoring agent and 15% of the resin (both based on the weight of the fiber) were employed. Six mil sheets of felt obtained had the properties listed in Table IV. The anchoring agents were as follows: Example 4—A condensation product of triethylenetetramine with 1.0 mole of ethylenedichloride effected in a single stage at 100–120° C. to a viscosity (on a sample diluted with ⅓ of its weight by water) of Q—R (Gardner-Holdt) at 25° C. Example 5—Used the same anchoring agent as that in Example 1 above. Example 6—Used as an anchoring agent a polyquaternary cumarone-indene resin obtained by introducing one chloromethyl group per 1.55 monomeric units of the original resin and then quaternizing with trimethylamine. Example 7—Used as the anchoring agent a homopolymer having the formula

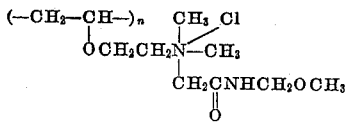

Example 8—Used a polystyrene having a molecular weight of about 4000 which was chloromethylated and quaternized with trimethylamine to produce one quaternary ammonium group in each two monomeric styrene units.

TABLE IV

| Example | Retention, Percent | pH | Treated Felt Prop., 6 Mil Sheets | | |
|---|---|---|---|---|---|
| | | | Burst | Tear | Tensile Str. |
| Control | 0.0 | | 5.4 | 46 | 4.5 |
| 4 | 43 | 8.2 | 7.0 | 45 | 5.7 |
| 5 | 59 | 8.1 | 9.6 | 48 | 6.5 |
| 6 | 70 | 6.7 | 7.4 | 53 | 5.5 |
| 7 | 72 | 6.9 | 7.9 | 51 | 5.6 |
| 8 | 100 | 6.9 | 10.1 | 63 | 6.9 |

*Examples 9–13*

Felts having a thickness of 15 mils are obtained by the commingling with a short-fibered-pulp, in five aqueous suspensions having a Canadian Standard Freeness of 630, of 1% of the anchoring agent of Example 3 and 10% of the five copolymers having the compositions noted in Table V. In each case, drying of the wet-laid material was effected at 200° C. for 2 minutes.

TABLE V

| Example | Copolymers of | | | Felt Properties | | |
|---|---|---|---|---|---|---|
| | Ethyl Acrylate, Percent | Methyl Methacrylate, Percent | Methacrylic Acid, Percent | Mullen Burst | Elmendorf Tear | Tensile |
| Control | | | | 3.9 | 36 | 4.3 |
| 9 | 66 | 32.7 | 1.3 | 6.4 | 54 | 6.0 |
| 10 | 60 | 33 | 7 | 8.9 | 58 | 7.7 |
| 11 | 48 | 50 | 2 | 9.7 | 71 | 8.6 |
| 12 | 48 | 47 | 5 | 10.5 | 67 | 9.5 |
| 13 | 30 | 65 | 5 | 6.7 | 56 | 6.8 |

*Example 14*

An unbleached kraft paper pulp was beaten to a Canadian Standard Freeness of 440 cc. and alum was added to bring the pH near 5. Then 1.5% of the anchoring agent of Example 1 was added and brought the pH to 5.4. Then 15% of the resin of Example 1 was mixed into the fiber dispersion in the heater. After the deposition, the paper sheet was dried at 200° C. for 2 minutes. Upon testing the resulting paper sheets which were 4 mils in thickness, it was found that the burst strength was increased 19%, the tear strength 12%, and the tensile strength 31% over a control sheet similarly prepared but without the inclusion of anchor and resin.

*Example 15*

Paper sheets 4 mils thick were formed by the procedure of Example 14 except that the resin was replaced by a copolymer of 96% vinyl acetate with 4% itaconic acid. The burst strength was increased 23%, the tear strength 10% and the tensile strength 33% over a control sheet.

*Example 16*

Felt sheets 10 mils thick were formed by the procedure of Example 1 except that the resin was replaced by a 5% aqueous solution of a copolymer of 95% 4-vinyl-pyridine and 5% of acrylic acid. The dried felts showed a 30% increase in burst strength, a 15% increase in tear strength, and a 40% increase in tensile strength over a control sheet.

*Example 17*

Paper sheets 4 mils in thickness were formed by the procedure of Example 14 except that (1) the anchoring agent was replaced by a cumarone-indene polymer containing quaternary ammonium groups obtained by reacting benzyldimethylamine with a chloromethylated cumarone-indene polymer (mol. wt. 600) containing about one chloromethyl group per two monomeric units of the original polymer, and (2) the resin was replaced by a copolymer of 97% vinyl chloride and 3% methacrylic acid. The burst strength was increased 21%, the tear strength 8%, and the tensile strength 32% over similarly prepared control sheets made without the resin and anchoring agent.

The treatment is adapted to improve the dry strengths of all types of fiber stocks, especially those of poor quality, such as oak, poplar, and yellow birch, and those of extremely short fiber length, as well as those of long fiber length and of good quality derivation, such as from spruce and hemlock. Any fibrous cellulosic material (capable of adsorbing cationic polyamine halohydrin resin from an aqueous solution thereof) may be coated or impregnated by the process of the invention. A wide variety of fibrous cellulosic material used in the preparation of paper, board, moulded resin fillers and the like may be used, such as kraft pulp, rag pulp, soda, sulfate, ground-wood, sulfite pulp and alpha pulp. Similarly, other forms of fibrous cellulose such as cotton linters, and the like may be employed. These materials may be used alone or in admixture with fibers from other sources, such as jute, hemp, sisal, strings, chopped canvas, and other material, either cellulosic or noncellulosic, that may improve the impact resistance, mechanical strength or other properties of the formed or moulded impregnated material.

The process of the present invention is adapted to produce papers and other fibrous products having increased strengths. The papers and felts obtained may be used for making paper boards, paper bags of the single wall or multi wall type, backings for flooring such as linoleum, roofing felts, waterproof or moisture-vaporproof paper, paper or board containers or cartons for milk, butter, foods, etc., resin-impregnated laminating paper, abrasives composed of resin-impregnated paper coated with abrasive particles, moulded articles, premoulded articles, electrical insulators, filter paper, heat-insulating paper, or loose masses of unfelted and unmoulded impregnated cellulose stock used for air filters, dust filters, heat-insulation and the like.

As pointed out above, the poly-cationic compound controls the distribution on deposition of the resin, assuring substantially uniform and thorough distribution while avoiding irregular, objectionable, "grape-bunch" effects. In addition, the carboxyl-containing resins are anchored by direct affinity between the carboxyl groups therein and the cationic nuclei in the anchoring agent which, in turn, is anchored to the cellulosic fibers by other cationic nuclei. The adsorption or affinity of the resin relative to the anchor minimizes the amount of resin lost in the "white water" drained during sheet operations. The resins of the present invention also impart no appreciable increase in wet strength, which allows recovery of "broke." The non-ionic dispersing agent assures the stability of the emulsion and avoids any adventitious deposition of flocs, aggregates, or sticky and adhesive masses in pipes or other parts of the equipment used for storing or conveying the resin dispersions to the point of application.

It is to be understood that changes and variations may be made without departing from the spirit and scope of the invention as defined in the appended claims.

I claim:
1. A process for producing wet-laid fibrous products comprising mixing a poly-cationic anchoring agent selected from the group consisting of poly-cationic sub-resinous to resinous condensation products of, and polymers of, an organic nitrogen compound into an aqueous suspension containing cellulosic fibers, mixing into the suspension a dispersion containing a non-ionic dispersing agent and a water-insoluble synthetic linear polymer, and salts thereof, of 0.25% to 25% of a polymerizable aliphatic compound containing a single vinylidene group and a carboxylic acid group and at least one other copolymerizable compound containing a single vinylidene group and no carboxylic acid group, and forming a sheet from the suspension.

2. A process for producing wet-laid fibrous products comprising mixing a poly-cationic anchoring agent selected from the group consisting of poly-cationic sub-resinous to resinous condensation products of, and polymers of, an organic nitrogen compound into an aqueous suspension containing cellulosic fibers, mixing into the suspension a dispersion containing a non-ionic dispersing agent and a water-insoluble synthetic linear copolymer of 0.5 to 8% of at least one polymerizable compound selected from the group consisting of acrylic acid, methacrylic acid, itaconic acid, and ammonium and alkali metal salts thereof with at least one other copolymerizable compound containing a single vinylidene group and no carboxylic acid group, and forming a sheet from the suspension.

3. A process as defined in claim 2 in which 0.5 to 100%, based on the weight of the fiber, of the copolymer is mixed into the suspension and the ratio of copolymer to anchoring agent is from 5:1 to 100:1.

4. A process for producing wet-laid fibrous products comprising mixing a cationic organic anchoring agent selected from the group consisting of poly-cationic sub-resinous to resinous condensation products of, and polymers of, an organic nitrogen compound into an aqueous suspension containing cellulosic fibers, mixing into the suspension while it has a pH of 7 to 9.5 a dispersion containing a non-ionic dispersing agent and a water-insoluble synthetic linear polymer, and salts thereof, of 0.25% to 25% of a polymerizable aliphatic compound containing a single vinylidene group and a carboxylic acid group and at least one other copolymerizable compound containing a single vinylidene group and no carboxylic acid group, and forming a sheet from the suspension.

5. A process for producing wet-laid fibrous products comprising mixing a cationic organic anchoring agent selected from the group consisting of poly-cationic sub-resinous to resinous condensation products of, and polymers of, an organic nitrogen compound into an aqueous suspension containing cellulosic fibers, mixing into the suspension while it has a pH of 7 to 9.5 a dispersion containing a non-ionic dispersing agent and a water-insoluble synthetic linear copolymer of 0.5 to 8% of at least one polymerizable compound selected from the group consisting of acrylic acid, methacrylic acid, itaconic acid, and ammonium and alkali metal salts thereof with at least one other copolymerizable compound containing a single vinylidene group and no carboxylic acid group, and forming a sheet from the suspension.

6. A process as defined in claim 5 in which 0.5 to 100%, based on the weight of the fiber, of the copolymer is mixed into the suspension and the ratio of copolymer to anchoring agent is from 5:1 to 100:1.

References Cited in the file of this patent

UNITED STATES PATENTS

| | | |
|---|---|---|
| 2,315,675 | Trommsdorf | Apr. 6, 1943 |
| 2,343,095 | Smith | Feb. 29, 1944 |
| 2,492,702 | Neubert et al. | Dec. 27, 1949 |
| 2,601,597 | Daniel et al. | June 24, 1952 |
| 2,601,598 | Daniel et al. | June 24, 1952 |
| 2,632,699 | Fowler et al. | Mar. 24, 1953 |
| 2,658,828 | Pattilloch | Nov. 10, 1953 |

FOREIGN PATENTS

| | | |
|---|---|---|
| 154,799 | Australia | Apr. 26, 1951 |
| 477,265 | Canada | Sept. 2, 1951 |